United States Patent
Chapman et al.

(10) Patent No.: US 11,386,314 B2
(45) Date of Patent: Jul. 12, 2022

(54) TRANSPARENT PANTOGRAPH PATTERN

(71) Applicant: Xerox Corporation, Norwalk, CT (US)

(72) Inventors: Edward N. Chapman, Rochester, NY (US); Jonathan Ross Ireland, Lancaster, PA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/006,829

(22) Filed: Aug. 29, 2020

(65) Prior Publication Data

US 2022/0067466 A1    Mar. 3, 2022

(51) Int. Cl.
*G06K 15/00* (2006.01)
*G06T 11/60* (2006.01)
*G06K 15/02* (2006.01)
*G06T 11/20* (2006.01)

(52) U.S. Cl.
CPC ....... *G06K 15/4095* (2013.01); *G06K 15/189* (2013.01); *G06K 15/1822* (2013.01); *G06T 11/203* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 4,210,346 A * | 7/1980 | Mowry, Jr. | ........ G03G 21/043 283/94 |
| 7,869,090 B2 | 1/2011 | Wang et al. | |
| 8,233,197 B2 * | 7/2012 | Wang | ............... G06K 1/123 358/3.28 |
| 8,355,180 B2 | 1/2013 | Wu et al. | |
| 8,593,698 B2 | 11/2013 | Simske et al. | |
| 8,817,330 B2 | 8/2014 | Cole et al. | |
| 8,891,136 B2 | 11/2014 | Simske et al. | |
| 8,909,775 B2 | 12/2014 | Tredoux et al. | |
| 9,092,858 B2 | 7/2015 | Simske et al. | |
| 9,860,414 B2 * | 1/2018 | Saitoh | ............. H04N 1/32144 |
| 9,864,906 B2 | 1/2018 | Eschbach et al. | |
| 9,864,920 B2 | 1/2018 | Eschbach et al. | |
| 2010/0150433 A1 * | 6/2010 | Wang | ............ H04N 1/00864 382/162 |

OTHER PUBLICATIONS

Wikipedia, "PostScript", Retrieved from "https://en.wikipedia.org/w/index.php?title=PostScript&oldid=967826412", page was last edited on Jul. 15, 2020, at 15:06 (UTC).

(Continued)

*Primary Examiner* — Dung D Tran
(74) *Attorney, Agent, or Firm* — Ortiz & Lopez, PLLC; Kermit D. Lopez; Luis M. Ortiz

(57) ABSTRACT

Methods and systems for rendering a transparent pantograph pattern. A background path and a foreground path for a pantograph pattern can be determined. An intersection internal to the background path and external to foreground path that is to be marked can be defined. Areas to be masked can be defined with respect to the pantograph pattern. The pantograph pattern can be then rendered as a transparent vector pattern pantograph by writing a background based on the background path and a foreground based on the foreground path and the areas defined as masked.

20 Claims, 8 Drawing Sheets

(56) References Cited

OTHER PUBLICATIONS

"Masking Images", Overview of Jim Version 8.0; http://www.xinapse.com/Manual/masking.html.
Wikipedia, "Color Gradient", Retrieved from "https://en.wikipedia.org/w/index.php?title=Color_gradient&oldid=967274730", page last edited on Jul. 12, 2020, at 08:32 (UTC).
Wikipedia, "Text Box", Retrieved from "https://en.wikipedia.org/w/index.php?title=Text_box&oldid=971816160", page was last edited on Aug. 8, 2020, at 11:49 (UTC).

* cited by examiner

TRANSPARENT PANTOGRAPH PATTERN

TECHNICAL FIELD

Embodiments are related to printing devices and techniques. Embodiments also relate to the field of security for document printing applications. Embodiments further relate to pantographs and void pantographs for authenticating and securing documents.

BACKGROUND

In conventional printing processes, requiring security measures, a pattern color space having specialty imaging characteristics has been utilized to provide the security measures and prevent counterfeiting of printed materials.

In addition, in conventional printing processes, a pattern color space has been utilized, in part on variable data, such as printing logos, serial numbers, seat locations, or other types of unique identifying information on printed materials.

In security applications, it may be desirable to add information to a document that prevents or hinders alterations and counterfeiting. These security elements may conflict with the overall aesthetics of the document.

Specialty imaging has been used, conventionally, in printed materials to provide fraud protection and anti-counterfeiting measures. Examples of the results of special imaging can be found in prescriptions, contracts, documents, coupons, and tickets. Typically, several specialty-imaging techniques can be used at various positions in a document.

Thus, in the area of security printing, documents may be protected from copying, forging and counterfeiting using multiple techniques. Specialty Imaging is one such method of security printing, which uses standard materials such as papers inks and toners. Typically, security-printing companies in the marketplace may require special (and expensive) materials. An example document is a prescription where a pharmacist would like to be able to possess a high level of confidence that a document is genuine.

As the quality of color copiers has improved, it has become easier to generate copies of a document that are indistinguishable from the original document. In many instances, the unauthorized copying of document content may have serious implications. For example, there is a concern that color copiers could be used to reproduce security documents, such as checks, stock certificates, automobile title instruments, and other documents of value, for illegal purposes.

One approach for authenticating documents and reducing unauthorized copying involves the use of what is commonly referred to as a void pantograph. Conventional techniques for creating pantographs involve forming printed dots (e.g., or other elements) of two different sizes and frequencies, which are used to create regions of similar tone, corresponding to a textual warning and a background, respectively, in an original (e.g., authentic) document. Tone refers to the visual appearance produced by halftone dots, bars, or marks which cover at least a portion of a printed area and which usually have a frequency that is measured in dots, lines, or marks per inch. To provide a constant tone, the smaller elements have a higher frequency than the larger elements. Because the tone of the textual warning and the tone of the background pattern are selected to be the substantially the same, these two regions have a similar visual impact on an observer of the original document, and the textual warning is not readily perceived.

Upon copying, however, the situation changes. Since the response of an image sensor employed in the scanner is different from the response of the human visual system, changes in the relative tone of the two different areas will appear. These changes may be due to the different frequency response of the sensor (with respect to an observer) and also due to other, normally non-linear, effects, such as a detection floor or threshold, where signals below a certain level are simply "lost." In general, the high frequency components are more strongly affected and attenuated. The difference in response of the scanner expresses itself as a relative change in tone in the copy and thus the hitherto invisible textual warning becomes visible. For example, in the resulting copy, only the larger printed dots may be clear. These larger dots spell out the word "void," or other pre-determined textual warning.

In current techniques, the pantograph can be applied to the substrate to create a pre-printed carrier. An image to be protected is then applied to the pre-printed carrier. These methods have generally been successful in protecting documents, and are sometimes combined with other techniques, such as the use of camouflage patterns, and the like. However, they are static in nature and thus in general are limited to generally valid, partly nondescript words like "void" or "copy." Void pantographs are thus a well-known technique used for fraud protection.

FIG. 1 illustrates a prior art pictorial diagram 10 depicting a document with a void pantograph. That is, an original document 12 is shown in FIG. 1 prior to photocopying of the document. A photocopied document 14 (e.g., after the original document 12 has been photocopied with a color copier) of the original document 12 is shown with the words "VOID" displayed. A void pantograph can include a pantograph screen with the word "VOID" hidden in it, which can be created by using special screens and background designs. When photocopied by a color printer, the word "VOID" appears on the copied document, such as the photocopied document 14. A document with a void pantograph is thus more difficult to duplicate than one with a standard pantograph.

Void pantographs are thus a technique that can be used for fraud protection. A variable data vector graphics pattern ink pantograph is one such example. The original image may appear as a gray rectangle, but when copied a word such as "VOID" can be displayed. Because the overlapping background and foreground patterns may be written in different steps, however, the foreground area should be erased prior to writing. This does not allow it to be transparent and the resulting pantograph cannot be used over a background such as an image or a gradient.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a method and system for rendering a transparent vector pattern ink pantograph.

It is another aspect of the disclosed embodiments to provide for improved document rendering applications.

It is further aspect of the disclosed embodiments to provide for methods and systems for authenticating and securing documents using pantographs including transparent vector pattern ink pantographs.

The aforementioned aspects and other objectives and advantages can now be achieved as described herein. In an embodiment, a method for rendering a transparent pantograph pattern, can involve: determining a background path and a foreground path for a pantograph pattern; defining an intersection internal to the background path and external to foreground path that is to be marked; defining areas to be masked with respect to the pantograph pattern; and rendering the pantograph pattern as a transparent vector pattern pantograph by writing a background based on the background path and a foreground based on the foreground path and the areas defined as masked.

In an embodiment, a system for rendering a transparent pantograph pattern, can comprise at least one processor, and a non-transitory computer-usable medium embodying computer program code, the computer-usable medium operable to communicate with the at least one processor. The computer program code can include instructions executable by the at least one processor and operable to: determine a background path and a foreground path for a pantograph pattern; define an intersection internal to the background path and external to foreground path that is to be marked; define areas to be masked with respect to the pantograph pattern; and render the pantograph pattern as a transparent vector pattern pantograph by writing a background based on the background path and a foreground based on the foreground path and the areas defined as masked.

In an embodiment, a transparent pantograph pattern can comprise a background path and a foreground path for a pantograph pattern, an intersection defined as internal to the background path and external to foreground path that is to be marked, and areas defined to be masked with respect to the pantograph pattern, wherein the pantograph pattern is renderable as a transparent vector pattern pantograph by writing a background based on the background path and a foreground based on the foreground path and the areas defined as masked.

In an embodiment, the background path can comprise a text box.

In an embodiment, the foreground path can comprise text.

In an embodiment, transparent vector pattern pantograph can be rendered with a document validation system.

In an embodiment, the transparent vector pattern pantograph can be rendered as a font.

In an embodiment, the transparent vector pattern pantograph can be rendered as a geometric object.

In an embodiment, the pantograph pattern can comprise at least one pattern ink.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
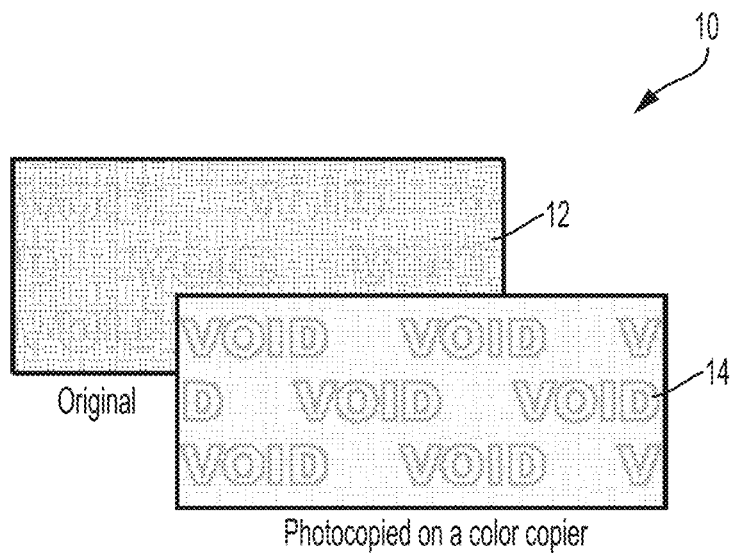
FIG. 1 illustrates a prior art image of vector void pantograph.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image.

The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation can perform "image processing" when it operates on an item of data that relates to part of an image.

"Contrast" is used to denote the visual difference between items, data points, and the like. It can be measured as a color difference or as a luminance difference or both.

A digital color printing system is an apparatus arrangement suited to accepting image data and rendering that image data upon a substrate.

The "RGB color model" is an additive color model in which red, green, and blue can be added together in various ways to reproduce a broad array of colors. The name of the model comes from the initials of the three additive primary colors, red, green, and blue.

A primary purpose of the RGB color model is for the sensing, representation, and display of images in electronic systems. RGB is a device-dependent color model: different devices detect or reproduce a given RGB value differently, since the color elements and their response to the individual R, G, and B levels vary from manufacturer to manufacturer, or even in the same device over time. Thus, an RGB value does not define the same color across devices without some kind of color management.

The "CMYK color model" is a subtractive color model, which can be used in color printing, and can also be used to describe the printing process itself. CMYK refers to the four inks used in some color printing: cyan, magenta, yellow, and black.

"Colorant" can refer to one of the fundamental subtractive C, M, Y, K, primaries, which may be realized in formulation as, liquid ink, solid ink, dye, or electrostatographic toner. A "colorant mixture" is a particular combination of C, M, Y, K colorants.

An "infrared mark" is a watermark embedded in the image that has the property of being relatively indecipherable under normal light, and yet decipherable under infrared illumination by appropriate infrared sensing devices, such as infrared cameras.

"Metameric" rendering/printing is the ability to use multiple colorant combinations to render a single visual color, as can be achieved when printing with more than three colorants.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The term 'void pantograph' as used herein can relate to a pantograph screen that has the word "VOID" (or another word) hidden in it, and which can be created using special screens and background designs. When photocopied by a color copier, the word "VOID" (or another word) can appear on the copied document. A document with a void pantograph is thus more difficult to duplicate.

The term "masked off" or "masking" as utilized herein can involve setting some pixel values in an image to zero, or some other "background" value. Masking can be accomplished by using an image as a mask. A mask image or "imagemask" (also referred to as an 'image mask') is an image where some of the pixel intensity values may be zero, and others may be non-zero. Wherever the pixel intensity value is zero in the mask image, then the pixel intensity of the resulting masked image can be set to the background value (normally zero).

Figure 2:
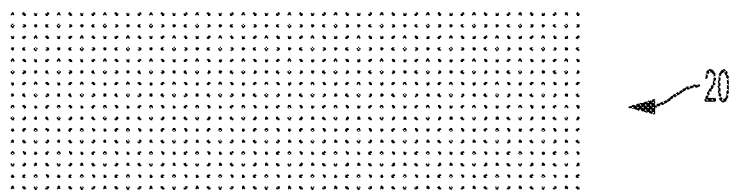
FIG. 2 illustrates an image of a background being written with a pattern, in accordance with an embodiment.

FIG. 2 illustrates an image 20 of a background (e.g., a textbox) being written with a pattern, in accordance with an embodiment. FIG. 2 thus illustrates an operation in which the background can be written.

Note that the term 'textbox' (also referred to as a 'text box', a 'text field' or 'text entry box') can relate to a control element of a graphical user interface (GUI), which can enable a user to input text information to be used by a computer program (i.e., software). The term 'textbox' (and variations thereof as indicated above) can also relate to an on-screen rectangular frame into which a user may type text. Text boxes can be used to add text, for example, in a drawing or paint program. The software used can determine the flexibility of a text box or textbox. Sometimes a user can keep on typing and the box expands to meet the user's input.

Figure 3:
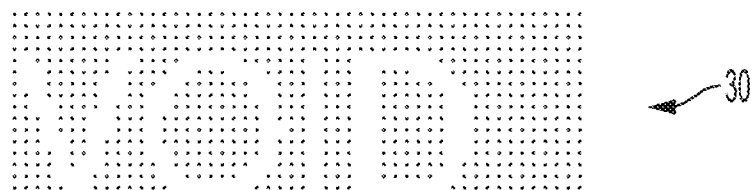
FIG. 3 illustrates an image of a foreground with a text area that will be erased prior to writing, in accordance with an embodiment.

FIG. 3 illustrates an image 30 of a foreground (e.g., text area) that will need to be erased prior to writing, in accordance with an embodiment. FIG. 3 illustrates an operation that can be implemented to erase the foreground.

Figure 4:
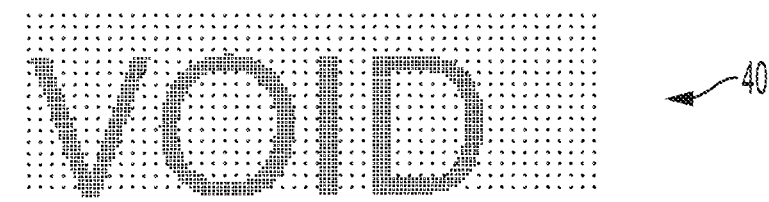
FIG. 4 illustrates an image of a foreground text begin written with another pattern, in accordance with an embodiment.

FIG. 4 illustrates an image 40 of a foreground text begin written with another pattern, in accordance with an embodiment. Note that if the image 40 shown in FIG. 4 readable, this is due to scaling as the image may appear as a single gray when printed. FIG. 4 thus illustrates an operation to write the foreground.

Figure 5:
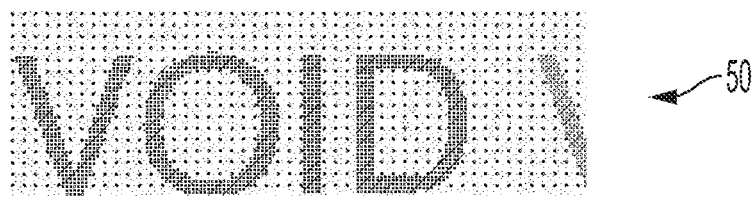
FIG. 5 illustrates an image of a pantograph that can act as a mask, in accordance with an embodiment.

FIG. 5 illustrates an image 50 of a pantograph that can act as a mask over color gradients, in accordance with an embodiment. Note that a PostScript imagemask can be used as a mask. In the disclosed embodiments, paths are being used (not images) to create the mask. Note that although the image 50 shown in FIG. 5 may be easy to read when printed, but may not function as a working pantograph. The image 50 shown in FIG. 5 demonstrates an example of the problem that needs solving and which the disclosed embodiments address. Thus, in order to use a vector pantograph over color gradients, a transparent version may be needed.

Note that as utilized herein, the term 'PostScript' can refer to a page description language. PostScript is an example of a dynamically typed, concatenative programming language. In addition, the term 'gradient' as utilized herein can relate to a color gradient, which can specify a range of position-dependent colors, and which may be utilized to fill a region. The colors produced by a gradient can vary continuously with position, producing smooth color transitions. A color gradient can also be known as a color ramp or a color progression. In assigning colors to a set of values, a gradient is a continuous color map, a type of color scheme.

Figure 6:
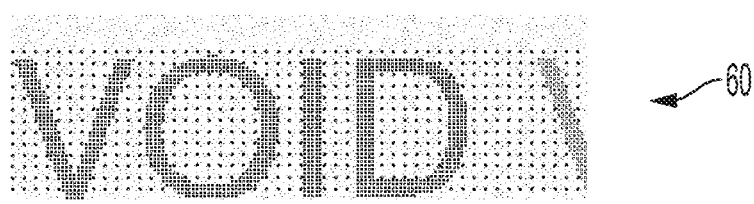
FIG. 6 illustrates an image of a transparent vector pattern ink pantograph, in accordance with an embodiment.

FIG. 6 illustrates an image 60 of a transparent vector pattern ink pantograph, in accordance with an embodiment. The transparent vector pattern ink pantograph depicted in FIG. 6 can be created and rendered according to the following method steps:

1) Create, a vector-based pantograph ink and a matching ink at another frequency;
2) Calculate the background path (e.g., a text box);
3) Calculate the foreground path (e.g., text);
4) Set or define the intersection of the inside of the background path and the outside of the foreground path able to be marked;
5) Set or define all other areas to be masked off;
6) Write the background (note that the dropped step of erase the foreground in FIG. 3; and
7) Write the foreground.

The approach outlined above thus can be implemented as an improvement to VOID pantograph technology may only be made on fixed backgrounds. That is, this approach can make use of a pattern-marking operator on top of an arbitrary background, which can allow the VOID mark to be printed in black over the other background desired in the other colorants.

Figure 7:
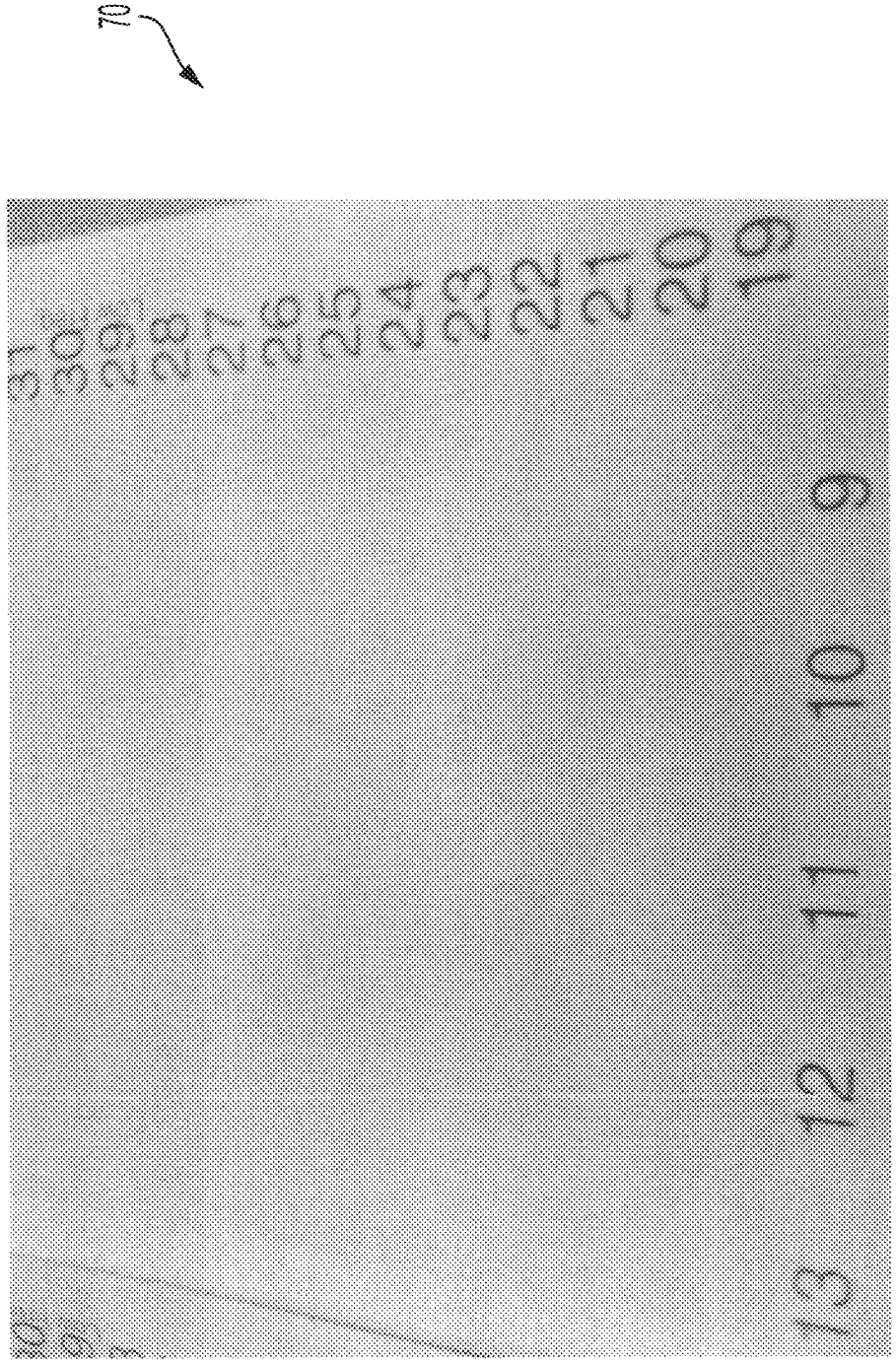
FIG. 7 illustrates an image of an original of a transparent vector pattern pantograph, in accordance with an embodiment.
Figure 8:
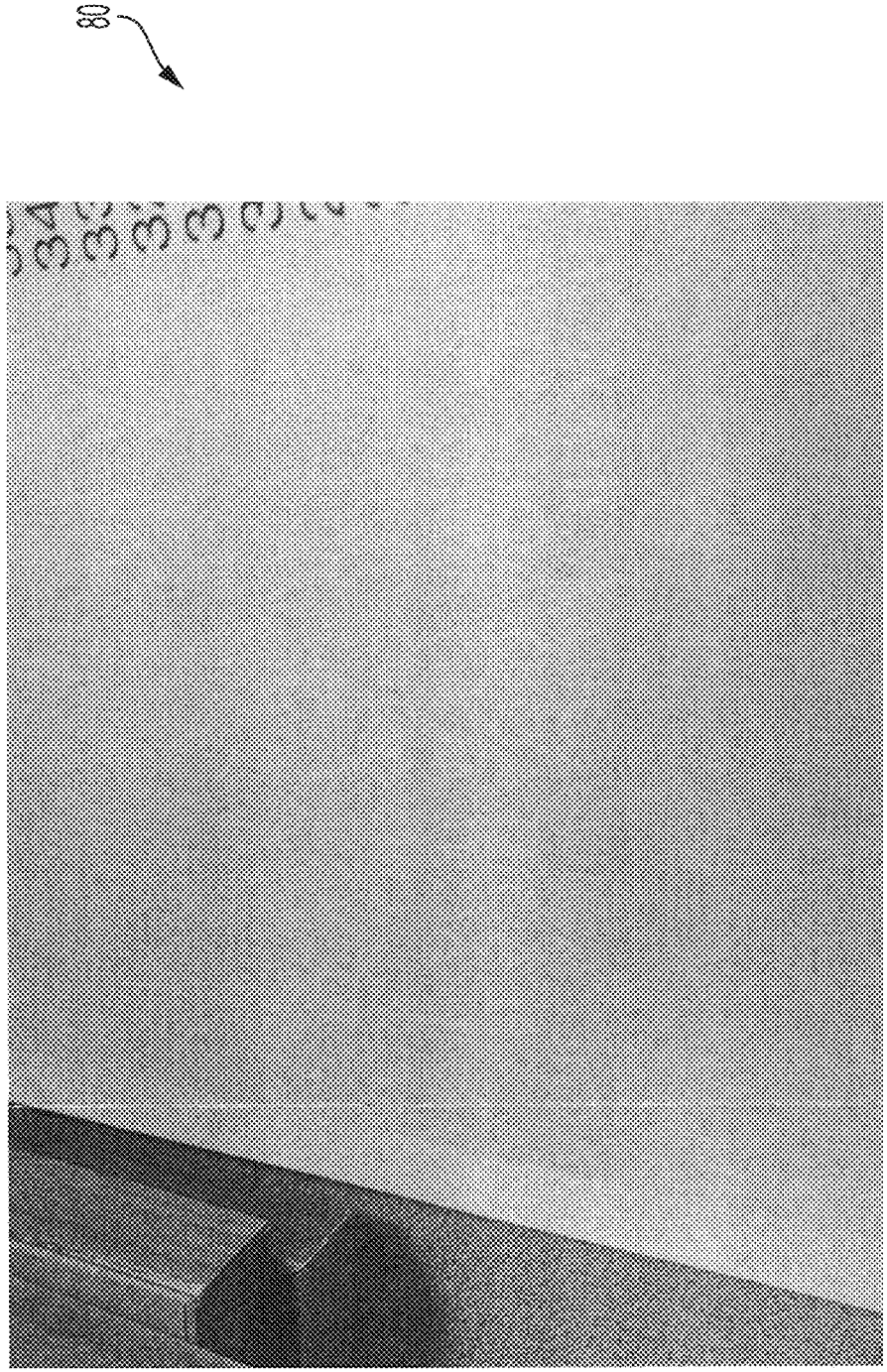
FIG. 8 illustrates an image of a copy of the transparent vector pattern pantograph, in accordance with an embodiment.

FIG. 7 illustrates an image 70 of an original of a transparent vector pattern pantograph, in accordance with an embodiment. FIG. 8 illustrates an image 80 of a copy of the transparent vector pattern pantograph, in accordance with an embodiment. FIG. 7 and FIG. 8 show an original version and a copy of the transparent vector pattern pantograph shown in FIG. 6. Note this can be implemented with a swatch sheet and a working area where the original is difficult to see "VOID" and the same area on the copy "VOID" appears can be used.

Figure 9:
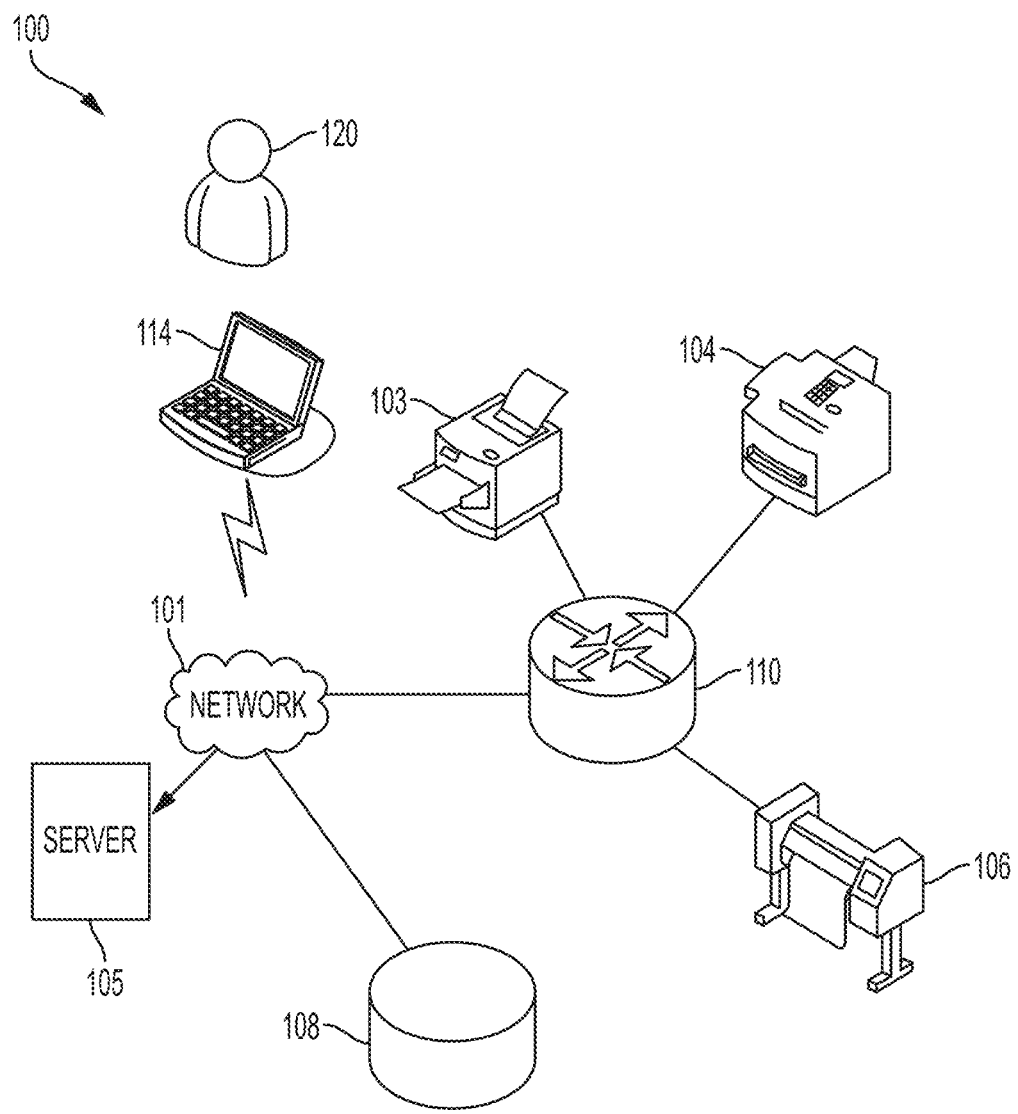
FIG. 9 illustrates a block diagram including various elements of equipment that may be included with and/or used by a document validation system 100 for the validation of a certified document, in accordance with an example embodiment.

FIG. 9 illustrates a block diagram including various elements of equipment that may be included with and/or used by a document validation system 100 for the validation of a certified document, in accordance with an example embodiment. The system 100 can include or can be connected to one or more networks 101. As used in this document, the term "connected" can relate to any configuration in which two or more devices may share data, programming instructions or other electronic communications with each other via wired and/or wireless communications. A user 120 can access the system 100 by one or more computing devices 114, which may execute programming instructions to implement the processes described below, or which may contain and execute software (e.g., such as a browser or other portal software) that can allow a user to access the system 100 as executed by an external computing device.

Any number of image-capture devices (e.g., scanner, a card scanner, flatbed image scanner, MFD, or similar device) 103, print devices 104 and 106, and a scanner 107 are connected to network 101 either directly or indirectly (e.g., via a router or other connecting device). The image-capture device 103, the print device 104, and the print device 106 are each an example of a printer or a printing system.

A networking device 110 such as a router may serve as a device to route information received via the network 101 to an appropriate print device. Networking device 110 may be any device capable of forwarding, routing, or otherwise transmitting packets and/or messages through a network, and any number of networking devices may be positioned within or on either side of network 101. A computer server 105 can also be implemented, which communicates with the network 105. In some cases, the network 105 can maintain the database 108 in a memory of the server 105 or the database 108 may be located or maintained elsewhere. It should be appreciated that print devices 103 or 104 in some embodiments may be MFD's with scanning capabilities or may be photocopy machines with scanning and printing capabilities and so on. In any event, print devices 103, 104 or devices such as scan 107 can be used to scan documents having the disclosed pantograph(s).

The system 100 also can include one or more data storage facilities 108, such as a database that resides in a computer-readable memory and serves as a document repository, that includes various data files corresponding to documents, document templates and/or security templates (including security elements) that may be available for validation of a secured document. The data storage facilities 108 may include memory portions that are physically separate from the user's computing device 114 as shown, and/or they may include memory portions that are part of the user's computing device 114.

In certain embodiments, the data files may include copies of secure documents and/or document templates generated by an author from a computing device included in system 100 and sent to a recipient as an electronic document or a hard copy document. For example, a secured document may be mailed or e-mailed to a recipient with the expectation of receiving the secured document back at some point in the future, potentially with additional information added to the secured document. Examples may include bank checks, diploma certificates, tickets, permits, deeds, and other such documents sent to the respective issuing authority (primary recipient). In certain embodiments, the primary recipient may provide the system 100 with data regarding potential secondary recipients, which may include name, address, e-mail, and other contact and permission information. Such information may also be stored as data files in the data storage facilities 108.

The systems described in this document may include implementations that are embodied in a print device, an image capture device, a computing device with a connected print device, a software program a cloud-based system, or any combination of these items.

There are many situations in which a user may require a secured copy of a document. A secured copy is a printed document that contains one or more security elements that serve as an indicator that the document was generated by an authorized entity. The authorized entity may be a federal, state or local government agency, or an entity to whom authorization can be delegated, such as a notary public. The system 100 can enable individuals who are not necessarily familiar with the location and/or identity of the security elements included in a document, in verifying the authenticity of the document.

Figure 10:
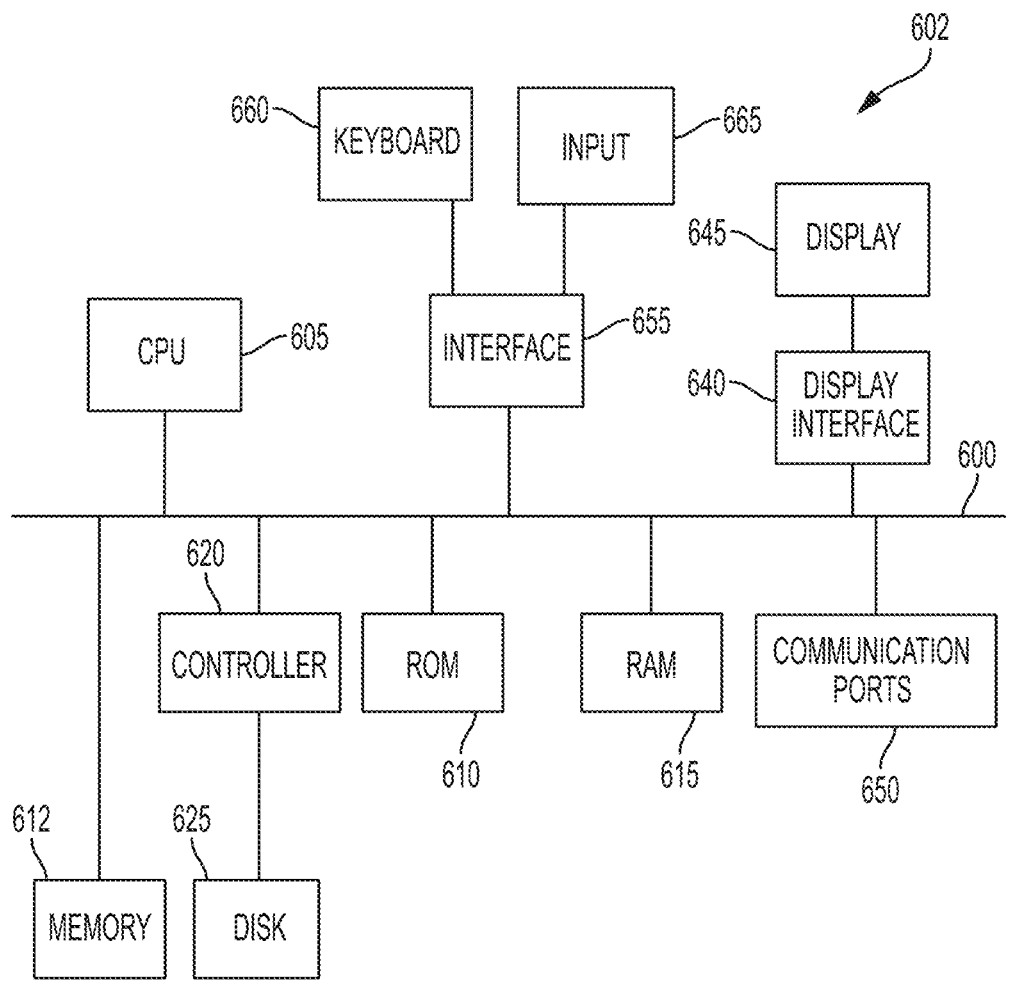
FIG. 10 depicts a block diagram of an example of a data-processing system including internal hardware that may be used to contain or implement program instructions, such as the steps, instructions and operations discussed herein, according to an example embodiment.

FIG. 10 depicts a block diagram of an example of a data-processing system 602 including internal hardware that may be used to contain or implement program instructions, such as the steps, instructions and operations discussed herein, according to an example embodiment. Note that the data-processing system 602 can be implemented as, for example, the server 105 shown in FIG. 9, which can communicate with the network 101 and/or maintain the database 108 of FIG. 9 in a memory such as, for example, the memory 612 depicted in FIG. 10. The data-processing system 602 may also be, for example, a computing device such as the computing device 114 shown in FIG. 9. Note that the term 'server' as utilized herein can relate to a piece of computer hardware and/or software that can provide functionality for other programs or devices, called "clients".

A system bus 600 can serve as an information highway interconnecting the other illustrated components of the hardware. CPU 605 represents one or more processors of the system, performing calculations and logic operations required to execute a program. CPU 605, alone or in conjunction with one or more of the other elements disclosed in FIG. 9 and/or FIG. 10, is an example of a processing device, computing device or processor as such terms are used within this disclosure. Read only memory (ROM) 610 and random access memory (RAM) 615 constitute examples of memory devices or processor-readable storage media.

A controller 620 can interface with one or more optional tangible, computer-readable memory devices 625 to the system bus 600. These memory devices 612 may include, for example, an external or internal disk drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium 625 such as a compact disk, a digital disk, flash memory, a memory card, a USB drive, an optical disc storage medium, and/or other recording medium controlled via a disk controller 620

An optional display interface 640 may permit information from the bus 600 to be displayed on the display 645 in audio, visual, graphic or alphanumeric format. Communication with external devices, such as a printing device, may occur using various communication ports 650. A communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

Figure 11:
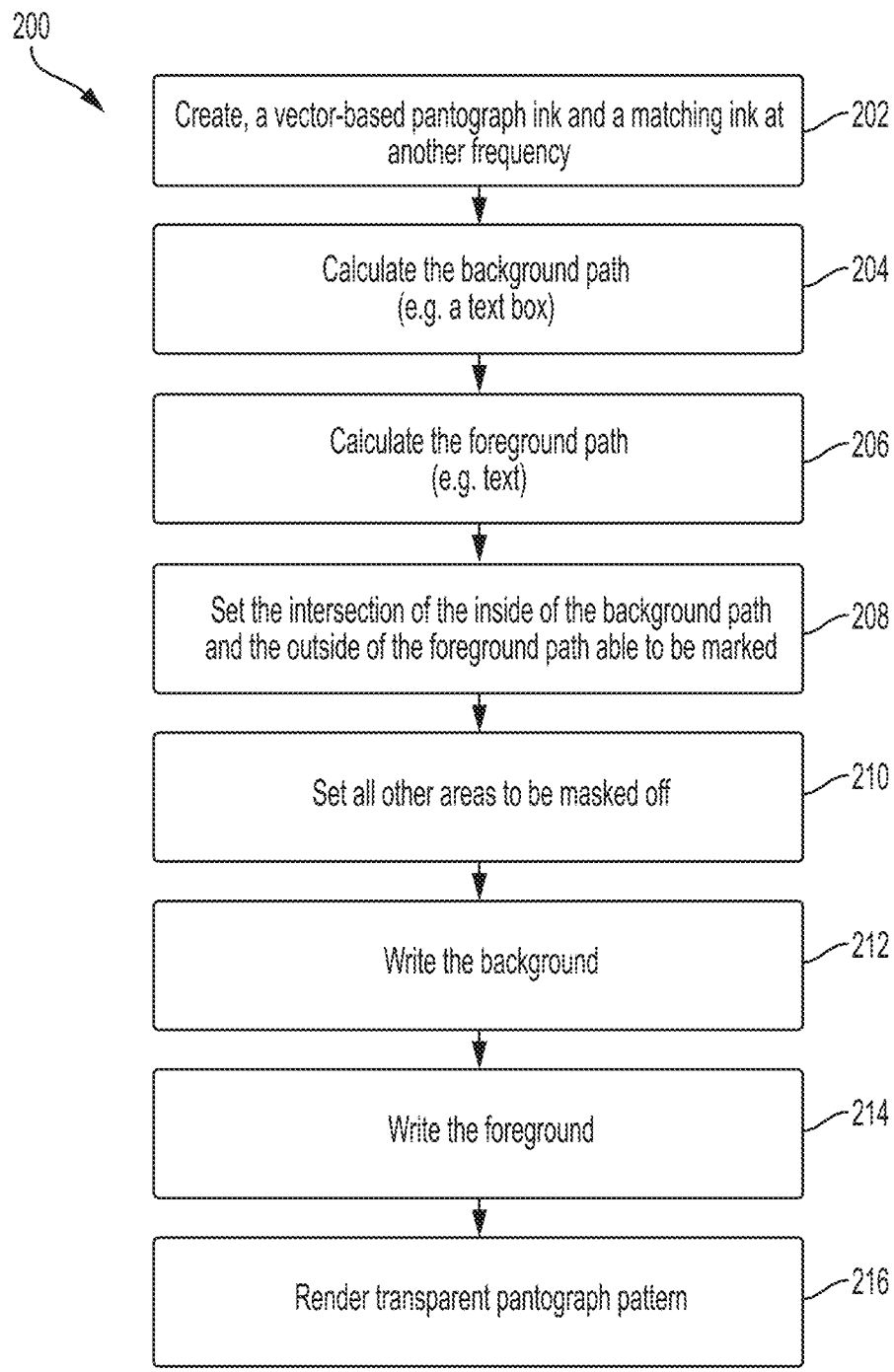
FIG. 11 illustrates a flow chart of operations depicting logical operational steps of a method for rendering a transparent pantograph pattern, in accordance with an embodiment.

FIG. 11 illustrates a flow chart of operations depicting logical operational steps of a method 200 for rendering a transparent pantograph pattern, in accordance with an embodiment. As depicted at block 202, a step or operation can be implemented to create, a vector-based pantograph ink and a matching ink at another frequency. Next, as shown at block 204, a step or operation can be implemented to calculate the background path (e.g. a text box). Thereafter, as illustrated at block 206, a step or operation can be implemented to calculate the foreground path (e.g. text).

Then, as shown at block 208, a step or operation can be implemented to define or set the intersection of the inside of the background path and the outside of the foreground path able to be marked. Next, as described at block 210, a step or operation can be implemented to define or set all other areas to be masked off. Thereafter, as indicated at block 214, a step or operation can be implemented to write the background (note the dropped step of 'erase the foreground' described and shown herein with respect to FIG. 3).

Next, as depicted at block 214, a step or operation can be implemented to write the foreground. Thereafter, as shown at block 216, a step or operation can be implemented to render a transparent vector pattern pantograph after writing the background based on the background path and the foreground based on the foreground path and the areas that were defined as masked off.

Note that the steps/operations shown at block 212 and 214 can involve writing the background based on the background path and the foreground based on the foreground path and the areas defined as masked. These operations can further include or involve steps or operations for writing a first pattern in the background and a second pattern as text and/or writing a second pattern in the background and the first pattern as the text. In other words, for example, one can write pattern 1 in the background and pattern 2 as the text or pattern 2 in the background and pattern 1 as the text. The copy may show light or dark text depending on which pattern was used.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams may represent a module, segment, or portion of instructions, which comprises one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component", "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term 'module' may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the system 100 shown in FIG. 9 and the data-processing system 602 illustrated in FIG. 10. A "module" can perform the various steps, operations or instructions disclosed herein, such as the steps or operations discussed and illustrated herein.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the disclosed embodiments. The claimed solution may be rooted in computer technology in order to overcome a problem specifically arising in the realm of computers, computer networks and image processing and document rendering.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of rendering a transparent pantograph pattern, comprising:
   determining a background path and a foreground path for a pantograph pattern;
   setting an intersection internal to the background path and external to foreground path that is to be marked;
   defining areas to be masked with respect to the pantograph pattern; and
   rendering the pantograph pattern as a transparent vector pattern pantograph after writing a background based on the background path and a foreground based on the foreground path and the areas defined as masked.

2. The method of claim 1 wherein writing the background based on the background path and the foreground based on the foreground path and the areas defined as masked, further comprises:
   writing a second pattern in the background and a first pattern as the text.

3. The method of claim 2 wherein the background path comprises a text box and the foreground path comprises text.

4. The method of claim 1 wherein the transparent vector pattern pantograph is rendered with a document validation system.

5. The method of claim 1 wherein the transparent vector pattern pantograph is rendered as a font.

6. The method of claim 1 wherein the transparent vector pattern pantograph is rendered as a geometric object.

7. The method of claim 1 wherein the pantograph pattern comprises at least one pattern ink.

8. A system of rendering a transparent pantograph pattern, comprising:
   at least one processor; and
   a non-transitory computer-usable medium embodying computer program code, the computer-usable medium operable to communicate with the at least one processor, the computer program code comprising instructions executable by the at least one processor and operable to:
   determine a background path and a foreground path for a pantograph pattern;
   set an intersection internal to the background path and external to foreground path that is to be marked;
   define areas to be masked with respect to the pantograph pattern; and
   render the pantograph pattern as a transparent vector pattern pantograph after writing a background based on the background path and a foreground based on the foreground path and the areas defined as masked.

9. The system of claim 8 wherein the instructions executable by the at least one processor and operable to write the background based on the background path and the foreground based on the foreground path and the areas defined as masked, further comprises instructions to:
   write a second pattern in the background and a first pattern as the text.

10. The system of claim 8 wherein the background path comprises a text box and the foreground comprises text.

11. The system of claim 8 wherein the transparent vector pattern pantograph is rendered with a document validation system that communicates with the at least one processor.

12. The system of claim 8 wherein the transparent vector pattern pantograph is rendered as a font.

13. The system of claim 8 wherein the transparent vector pattern pantograph is rendered as a geometric object.

14. The system of claim 8 wherein the pantograph pattern comprises at least one pattern ink.

15. A transparent pantograph pattern, comprising:
   printable media comprising a pantograph pattern;
   a background path and a foreground path for the pantograph pattern;
   an intersection set as internal to the background path and external to foreground path that is to be marked;
   areas defined to be masked with respect to the pantograph pattern, wherein the pantograph pattern is renderable on the printable media as a transparent vector pattern pantograph after writing a background based on the background path and a foreground based on the foreground path and the areas defined as masked.

16. The transparent pantograph pattern of claim 15, wherein writing the background based on the background path and the foreground based on the foreground path and the areas defined as masked, further comprises:
   writing a second pattern in the background and a first pattern as the text.

17. The transparent pantograph pattern of claim 16 wherein the background path comprises a text box and the foreground path comprises text.

18. The transparent pantograph pattern of claim 15 wherein the transparent vector pattern pantograph is rendered as a font.

19. The transparent pantograph pattern of claim 15 wherein the transparent vector pattern pantograph is rendered as a geometric object.

20. The transparent pantograph pattern of claim 15 wherein the pantograph pattern comprises at least one pattern ink.

* * * * *